Patented Mar. 28, 1939

2,151,758

UNITED STATES PATENT OFFICE 2,151,758

METHOD OF RESISTANCE WELDING

John R. Gier, Jr., Penn Township, Allegheny County, Pa., assignor to Westinghouse Electric & Manufacturing Company, East Pittsburgh, Pa., a corporation of Pennsylvania No Drawing. Application November 28, 1936, Serial No. 113,261

1 Claim. (Cl. 219—10)

My invention relates generally to welding, and has reference in particular to a method of uniting metallic members of high conductivity by resistance or spot welding.

Heretofore, it has been found difficult to secure satisfactory welds of members of high conductivity, such as copper, or copper bearing alloys, by resistance or spot welding methods. As is well known, the heat in a resistance weld is due to a flow of current through the resistance at the point of contact of the members. In the case of copper and copper alloy members, which have exceedingly low contact resistance, as much heat is often developed at the points of contact of the electrodes with the members as is developed between the members themselves, where it is desired. This results in excessive heating and burning of the electrodes, which greatly shortens their life, and also pits, heat stains, or otherwise mars the surface of the members. At the same time, insufficient heat is produced between the members themselves, so that there is only partial fusion between the members, giving generally an altogether unsatisfactory weld.

Various methods of improving resistance welds of high conductivity members have been tried in which solid, granular, or finely powdered materials are interposed between the surfaces of the members. Carbonaceous materials, as well as iron powder and filings, have been utilized between members which it is desired to weld, to increase the contact resistance between the members and thus localize the heat. In some instances, agents have been used between the members not only to increase the contact resistance, but further to react chemically to produce additional heat at the point of welding.

Such materials, however, while increasing the contact resistance between the members so as to relieve burning at the electrodes and marring of the surfaces of the members, have not been altogether satisfactory in producing sound welds. While iron and carbon satisfactorily increase the contact resistance between the members and further aid in cleaning the surfaces to be welded of any oxide film which might be present, the resultant welds have been found to be porous and brittle.

Where the metals of the group comprising manganese, nickel, and cobalt, have been used as agents to secure resistance welds between members of high conductivity, and in particular with copper or copper alloy members, it has been found that extremely satisfactory welds may be secured. Not only do these metals, manganese, nickel and cobalt, act as a means of increasing the contact resistance between the members, thereby localizing the heat of welding between the members where it is desired and also possibly as reducing agents to remove any oxide film on the adjacent surfaces, but they further act to produce welds that are sound and ductile, and have a much higher tensile strength than is possible to secure where other agents are used.

This result is apparently due to the fact that these metals not only increase contact resistance between the members and clean the surfaces, but they actually alloy with the copper of the members. Manganese is soluble in copper throughout the entire range of proportions. Nickel similarly is exceedingly soluble in copper, while cobalt is soluble in copper to a large degree. Hence, instead of merely furnishing a method of localizing the heat of welding and deoxidizing the surfaces, particles of these metals are not merely included in the weld metal of the joint as separate particles, but actually go into solid solution with the fused metal of the members, forming a zone of alloy of continuously varying proportions about the point of welding. This results in an alloy weld zone which, instead of having a sharp line of demarcation at the junction of the members, consists of a continuous transition from the one member to the other, giving a joint of remarkably high tensile strength and ductility, instead of the porous and brittle joint so often secured when other metals or agents are used to increase the contact resistance.

It is, therefore, an object of my invention to provide a method for securing satisfactory resistance and spot welds of members of high conductivity.

Another object of my invention is to provide a method of uniting members of low electrical resistance, wherein a strong, ductile weld is secured.

A further object of my invention is to provide a method of uniting copper, or copper bearing members by resistance or spot welding, wherein an alloy weld is secured by interposing between the members in a suitable manner, finely divided particles of a metal of the group comprising manganese, nickel and cobalt, which readily alloys with the copper in the zone of the weld.

A still further object of my invention is to provide a method of uniting copper, or copper bearing members by resistance or spot welding, wherein an alloy weld of continuously varying proportions is secured in the zone of fusion through the insertion between the members, before welding of a film of particles of an alloy of a metal of the group comprising manganese, nickel and cobalt with copper.

Still another object of my invention is to provide an alloy weld joint between a pair of metallic members of high conductivity, wherein an interposed resistance increasing and reducing agent forms a solid solution with the fused metal of the members in a continuously varying proportion through the zone of fusion.

In a preferred form of my invention, a film of particles of a metal which will alloy with copper, such as for instance, manganese, may be interposed in any desired manner, between a pair of copper, or copper alloy members which it is desired to weld, such as by distributing it in the form of a powder, or applying it as a paint to one of the adjacent surfaces of the members. The welding of the members may then be performed in any manner well known in the art of resistance or spot welding, such as by placing the members between a pair of relatively movable electrodes which are connected to the opposite terminals of a source of electric current, and bringing the electrodes into contact with the opposite surfaces of the members, under pressure. As the portions of the members under the electrodes become heated by the passage of the current, the adjacent surfaces will be brought first to the welding temperature because of the increased contact resistance due to the spacing of the members by the film of metallic particles. These particles themselves fuse and alloy with the copper of the members before the outer surfaces of the members have time to become unduly heated. This prevents burning of the electrodes and marring of the outer faces of the members.

It will be found that a weld is secured in which the interposed particles of manganese, or other suitable metal, have been fused together with the copper of the members, forming a solid solution which has no sharp line of demarcation, but varies continuously in its proportions of copper and the inserted metal across the zone of fusion, which proportions may be controlled by varying the thickness of the interposed film of manganese particles. Such a weld has been found to be exceedingly ductile and of unusually high tensile strength, in contrast to the brittle and porous welds secured where other resistance increasing agents are used.

As certain changes may be made in the above description and different embodiments of my invention may be made without departing from the spirit thereof, it is intended that all the matter in the above description shall be considered as illustrative, and not in a limiting sense.

I claim as my invention:

A method of uniting copper alloy members having low contact resistance, consisting of, interposing a layer of particles of manganese between the members to increase the contact resistance therebetween, and passing an electric current between the members to fuse the manganese particles and adjacent portions of the members and form a copper manganese alloy of continuously varying proportions across the zone of fusion.

JOHN R. GIER, Jr.